United States Patent
Commaret et al.

(10) Patent No.: US 8,387,395 B2
(45) Date of Patent: Mar. 5, 2013

(54) ANNULAR COMBUSTION CHAMBER FOR A TURBOMACHINE

(75) Inventors: Patrice Andre Commaret, Rubelles (FR); Jean-Michel Serge Marcel Duret, Bondoufle (FR); Didier Hippolyte Hernandez, Quiers (FR); David Locatelli, Gex (FR)

(73) Assignee: SNECMA, Paris (FR)

( * ) Notice: Subject to any disclaimer, the term of this patent is extended or adjusted under 35 U.S.C. 154(b) by 1323 days.

(21) Appl. No.: 11/837,856

(22) Filed: Aug. 13, 2007

(65) Prior Publication Data
US 2008/0155988 A1 Jul. 3, 2008

(30) Foreign Application Priority Data
Aug. 28, 2006 (FR) ...................................... 06 53478

(51) Int. Cl.
*F02C 1/00* (2006.01)
(52) U.S. Cl. ........................................................ 60/752
(58) Field of Classification Search ................ 60/796, 60/800, 804, 752–760
See application file for complete search history.

(56) References Cited

U.S. PATENT DOCUMENTS

| | | | | | |
|---|---|---|---|---|---|
| 2,699,648 A | * | 1/1955 | Berkey | ............................ | 60/756 |
| 3,064,425 A | * | 11/1962 | Hayes | ............................ | 60/756 |
| 3,408,812 A | * | 11/1968 | Stenger | ............................ | 60/757 |
| 3,854,285 A | * | 12/1974 | Stenger et al. | ................... | 60/756 |
| 3,990,232 A | * | 11/1976 | Campbell | ........................ | 60/756 |
| 4,766,722 A | * | 8/1988 | Bayle-Laboure et al. | ... | 60/39.23 |
| 5,012,645 A | * | 5/1991 | Reynolds | ........................ | 60/754 |
| 5,329,761 A | * | 7/1994 | Ablett et al. | ..................... | 60/804 |
| 5,329,773 A | * | 7/1994 | Myers et al. | .................... | 60/759 |
| 5,479,772 A | * | 1/1996 | Halila | .............................. | 60/800 |
| 5,916,142 A | * | 6/1999 | Snyder et al. | ................... | 60/748 |
| 6,868,675 B1 | | 3/2005 | Kuhn et al. | | |
| 7,032,386 B2 | * | 4/2006 | Mandai et al. | .................. | 60/757 |

FOREIGN PATENT DOCUMENTS

| | | |
|---|---|---|
| EP | 1 265 031 A1 | 12/2002 |
| EP | 1 265 033 A1 | 12/2002 |
| EP | 1 400 756 A1 | 3/2004 |

OTHER PUBLICATIONS

U.S. Appl. No. 11/859,280, filed Sep. 21, 2007, Commaret, et al.
U.S. Appl. No. 12/190,105, filed Aug. 12, 2008, Commaret, et al.

* cited by examiner

*Primary Examiner* — Phutthiwat Wongwian
(74) *Attorney, Agent, or Firm* — Oblon, Spivak, McClelland, Maier & Neustadt, L.L.P.

(57) ABSTRACT

An annular combustion chamber for a turbomachine is disclosed. The chamber includes an inner wall, an outer wall, and a chamber end wall disposed between the inner and outer walls in the upstream region of the chamber. The chamber end wall presents an outer fastener rim and/or an inner fastener rim, and the outer and/or inner wall presents a respective upstream fastener rim. The chamber end wall and the outer and/or inner wall are fastened together via their fastener rims. Cooling channels are made between the fastener rims and open out to the inside of the combustion chamber. Advantageously, a spacer is placed between the fastener rims, and the channels are formed in the thickness or in the sides of the spacer.

14 Claims, 7 Drawing Sheets

ANNULAR COMBUSTION CHAMBER FOR A TURBOMACHINE

The invention relates to an annular combustion chamber for a turbomachine. It is intended for any type of turbomachine: turbojet, turboprop, terrestrial gas turbine, . . . .

BACKGROUND OF THE INVENTION

More particularly, the invention relates to an annular combustion chamber for a turbomachine of the type comprising an inner wall, an outer wall, and a chamber end wall disposed between said inner and outer walls in the upstream region of said chamber, the chamber end wall presenting an outer fastener rim and/or an inner fastener rim, and the outer and/or inner wall presenting an upstream fastener rim, the chamber end wall and the outer and/or inner wall being fastened together via their fastener rims.

A portion of a turbojet including a prior art combustion chamber of the above-specified type is shown in FIG. 1.

That combustion chamber 24 comprises an inner wall 26, an outer wall 28, and a chamber end wall 30 disposed between said inner and outer walls, in the upstream region of said chamber. The inner and outer walls 26 and 28 are circular and coaxial about an axis 10, which axis is the axis of rotation of the turbojet.

Upstream and downstream are defined relative to the normal flow direction of gas through the turbojet.

The chamber end wall 30 presents at its inner and outer peripheries, respectively: an inner fastener rim 32 and an outer fastener rim 34. Furthermore, at their upstream ends, the inner and outer walls 26 and 28 present respective fastener rims 36 and 38. The chamber end wall 30 and the outer wall 28 (or inner wall 26) are fastened together via the rims 34 and 38 (or the rims 32 and 36) by means of bolts.

The air flow F coming from the compressor of the turbojet (not shown) that is situated upstream from the combustion chamber 24 is represented by arrows F in FIG. 1.

The outer wall portion 28a (or inner wall portion 26a) situated immediately downstream from the chamber end wall 30 is subjected to very high temperatures in operation, and it is necessary to cool this wall portion 28a as effectively as possible.

To perform such cooling, it is known to make multiple small-sized perforations in this wall portion 28a (or 26a) referred to as multiperforations 55 (where the size of these multiperforations is deliberately exaggerated in the figures).

The multiperforations 55 are fed with air by the air flow F passing around the chamber 24 so as to create a protective air film f on the inside face (i.e. the face facing towards the inside of the chamber 24) of the wall portion 28a (or 26a). This air film is represented by arrows f in FIG. 1.

OBJECTS AND SUMMARY OF THE INVENTION

An object of the invention is to provide a novel solution for cooling the outer and/or inner wall portion(s) situated immediately downstream from the chamber end wall. This novel solution can be used on its own or in addition to presently-known cooling solutions, such as the above-mentioned multiperforations.

The invention thus provides an annular combustion chamber for a turbomachine, the chamber comprising an inner wall, an outer wall, and a chamber end wall disposed between said inner and outer walls in the upstream region of said chamber, the chamber end wall presenting an outer fastener rim and/or an inner fastener rim, and the outer and/or inner wall presenting an upstream fastener rim, the chamber end wall and the outer and/or inner wall being fastened together via their fastener rims, wherein cooling channels are made between its fastener rims, said channels opening out to the inside of the combustion chamber.

These channels serve to deliver air upstream from the inside faces of the inner and outer wall portions situated immediately downstream from the chamber end wall, in such a manner as to cool them. Furthermore, by acting on the number of channels, and on their distribution, it is possible to create a protective air film on said inside faces, said film forming a barrier against the hot gas of the combustion chamber.

BRIEF DESCRIPTION OF THE DRAWINGS

The invention and its advantages can be better understood on reading the following detailed description of embodiments of the invention. The description is made with reference to the accompanying drawings, in which.

MORE DETAILED DESCRIPTION

Figure 1:
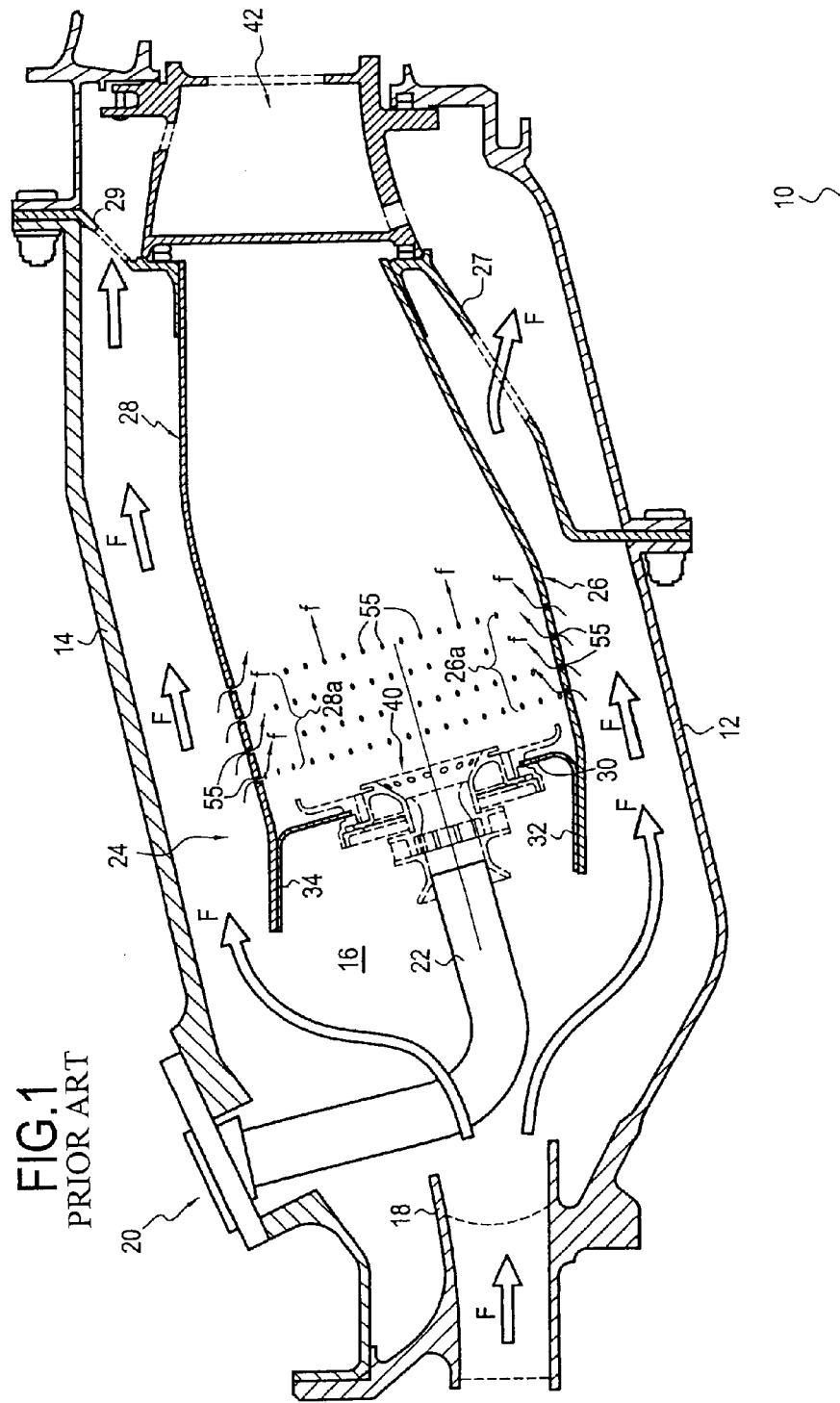
FIG. 1 is a diagrammatic axial half-section view showing a portion of a turbomachine fitted with a prior art combustion chamber.

FIG. 1 is a diagrammatic axial half-section view of a portion of an airplane turbojet fitted with a prior art combustion chamber, and serves to visualize the environment of the combustion chamber.

The turbojet portion shown in FIG. 1 comprises:

an inner circular envelope or inner casing 12 having a main axis corresponding to the axis of rotation of the turbomachine, and an outer circular envelope or outer casing 14 that is coaxial thereabout; and an annular space 16 between the two casings 12 and 14 that receives the compressed oxidizer, generally air, coming from a compressor situated upstream (not shown) via an annular diffusion duct 18.

Going from upstream to downstream relative to the combustion chamber, the space 16 contains:

an injector assembly constituted by a plurality of injector systems 20 regularly distributed around the duct 18 and each including a fuel injector nozzle 22 secured to the outer casing 14;

a combustion chamber 24 as described above. The chamber end wall 30 is provided with orifices 40 to enable fuel to be injected together with a fraction of the oxidizer into the combustion chamber. A holder system, a mixer, and a deflector (drawn in dashed lines) are associated with each injector nozzle 22 and are mounted on the chamber end wall 30, inside the orifices 40;

inner and outer connection flanges 27 and 29, respectively connecting the inner and outer walls 26 and 28 to the inner and outer casings 12 and 14; and an annular nozzle 42 forming an inlet stage to a high pressure turbine (not shown).

Figure 2:
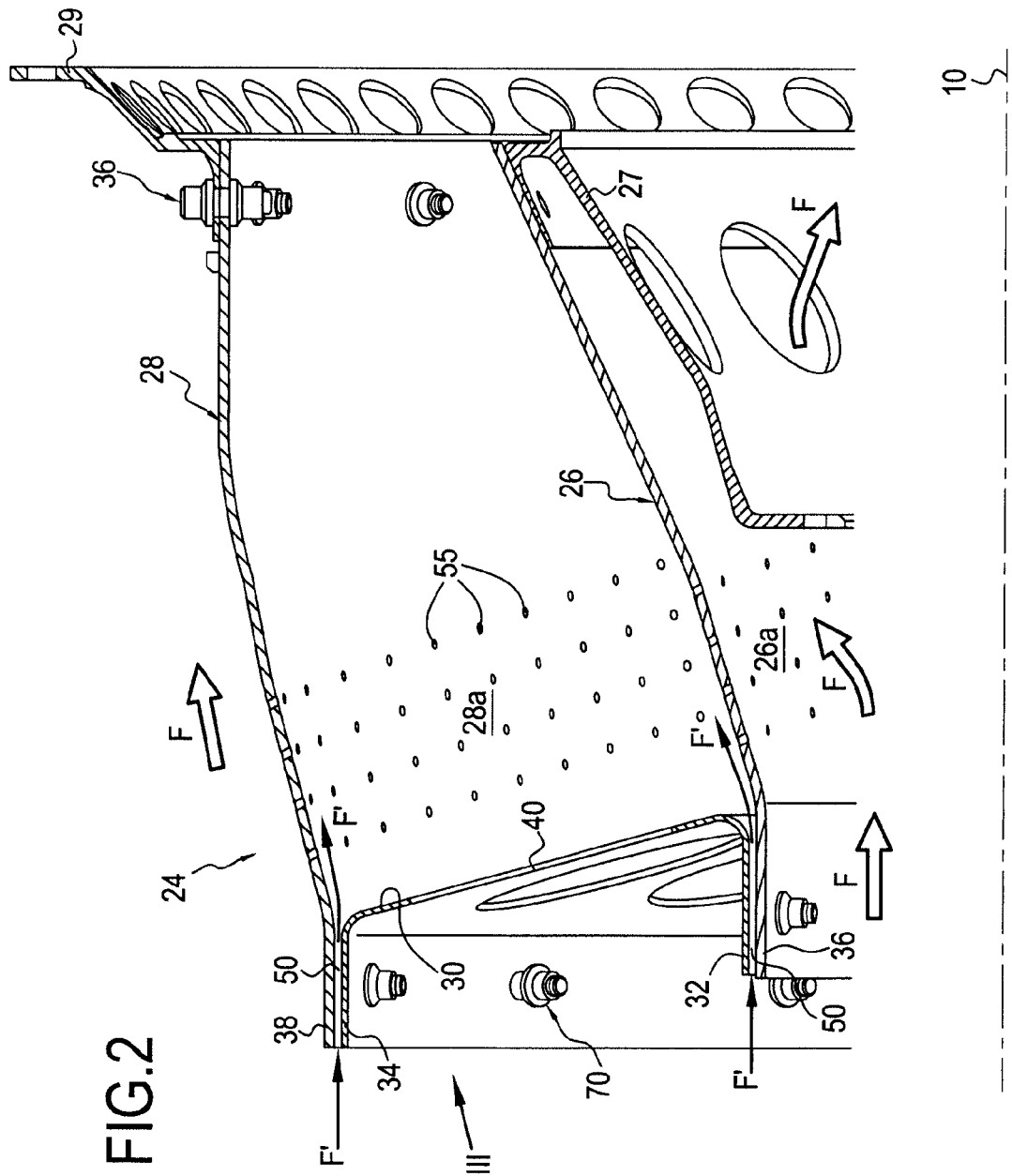
FIG. 2 is an axial half-section of a first embodiment of a combustion chamber of the invention.

With reference to FIG. 2, there follows a description of a first example of a combustion chamber of the invention.

This combustion chamber is of the same type as that shown in FIG. 1 and the same numerical references are used to designate elements that are common to both chambers.

The chamber of FIG. 2 differs from the prior art chamber of FIG. 1 in that it presents cooling channels 50 of the invention made firstly between the outer fastener rim 34 of the chamber end wall 30 and the upstream fastener rim 38 of the outer wall 28, and secondly between the inner fastener rim 32 of the chamber end wall 30 and the upstream fastener rim 36 of the inner wall 26.

These channels 50 convey an air flow F' (represented by arrows) taken from the air flow F. The air flow F' serves to cool the inside faces of the inner and outer wall portions 26a and 28a that are situated immediately downstream from the chamber end wall 30. These channels 50 are thus additional to the multiperforations 55, and they serve to improve the cooling of said wall portions 26a and 28a.

Figure 3A:
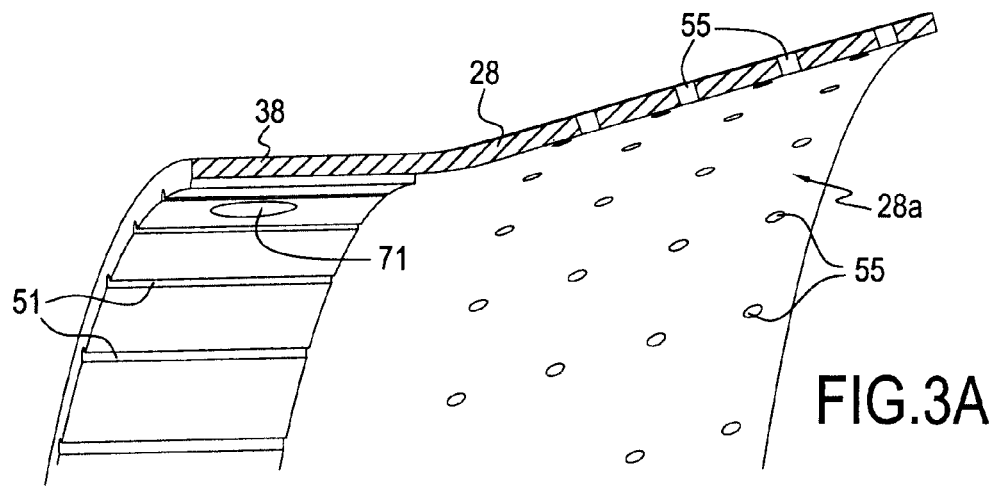
FIG. 3A is a fragmentary perspective view looking along arrow III showing the upstream fastener rim of the outer wall of the FIG. 2 combustion chamber.
Figure 3B:
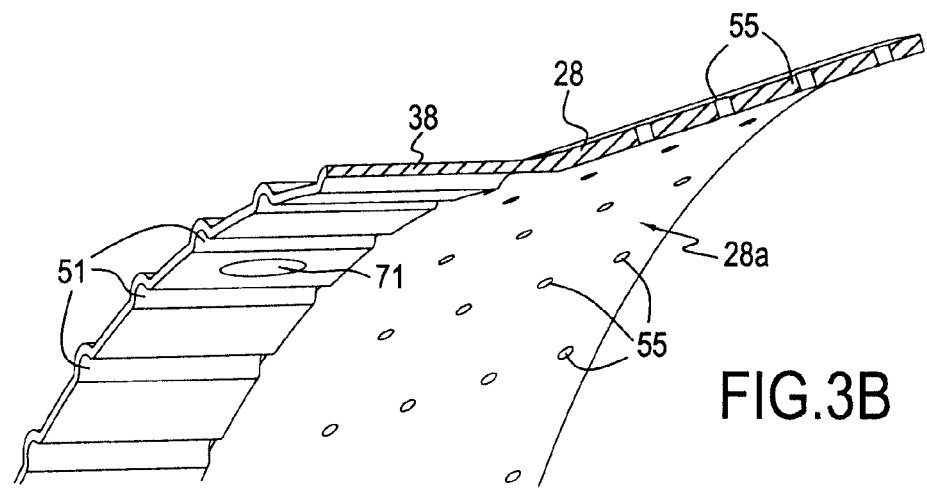
FIG. 3B is a view analogous to that of FIG. 3A showing another example of a fastener rim.

The channels 50 can be made in various ways. In the example of FIGS. 2 and 3, they are made by forming grooves 51 in the inside face of the fastener rim 38 (or 36) of the outer wall 28 (or inner wall 26) as shown in FIGS. 3A and 3B. These grooves can be made by removing material, in particular by machining the rim 38, as shown in FIG. 3A, or by deforming the rim, in particular by stamping, as shown in FIG. 3B.

The channels 50 may also be made by forming grooves in the outside face of the outer fastener rim 34 (or the inner fastener rim 32) of the chamber end wall 30.

In another configuration, the channels are made by forming grooves both in the outer fastener rim 34 (or the inner fastener rim 32) of the chamber end wall 30 and in the fastener rim 38 (or 36) of the outer wall 28 (or inner wall 26). The grooves in the chamber end wall can be then be made to coincide with those in the wall 28 (or 26) or on the contrary they can be offset, and in particular disposed in a staggered configuration.

In another configuration that is not shown, the fastener rims are of sufficient thickness to be capable of making the cooling channels 50 in the thickness of said rims.

In general, it should be observed that the cooling channels 50 could be made solely between the outer rim 34 and the rim 38, or solely between the inner rim 32 and the rim 36.

In the example of FIG. 2, the chamber end wall 30 is fastened to the outer and inner walls 28 and 26 by passing bolts through the fastener rims 34 & 38 and 32 & 36. More precisely, the bolts 70 are passed through holes 71 provided for this purpose in said rims. Bolting presents the advantage of enabling the inner and outer walls to be separated from the chamber end wall. Nevertheless, other fastener systems could be envisaged.

Figure 4:
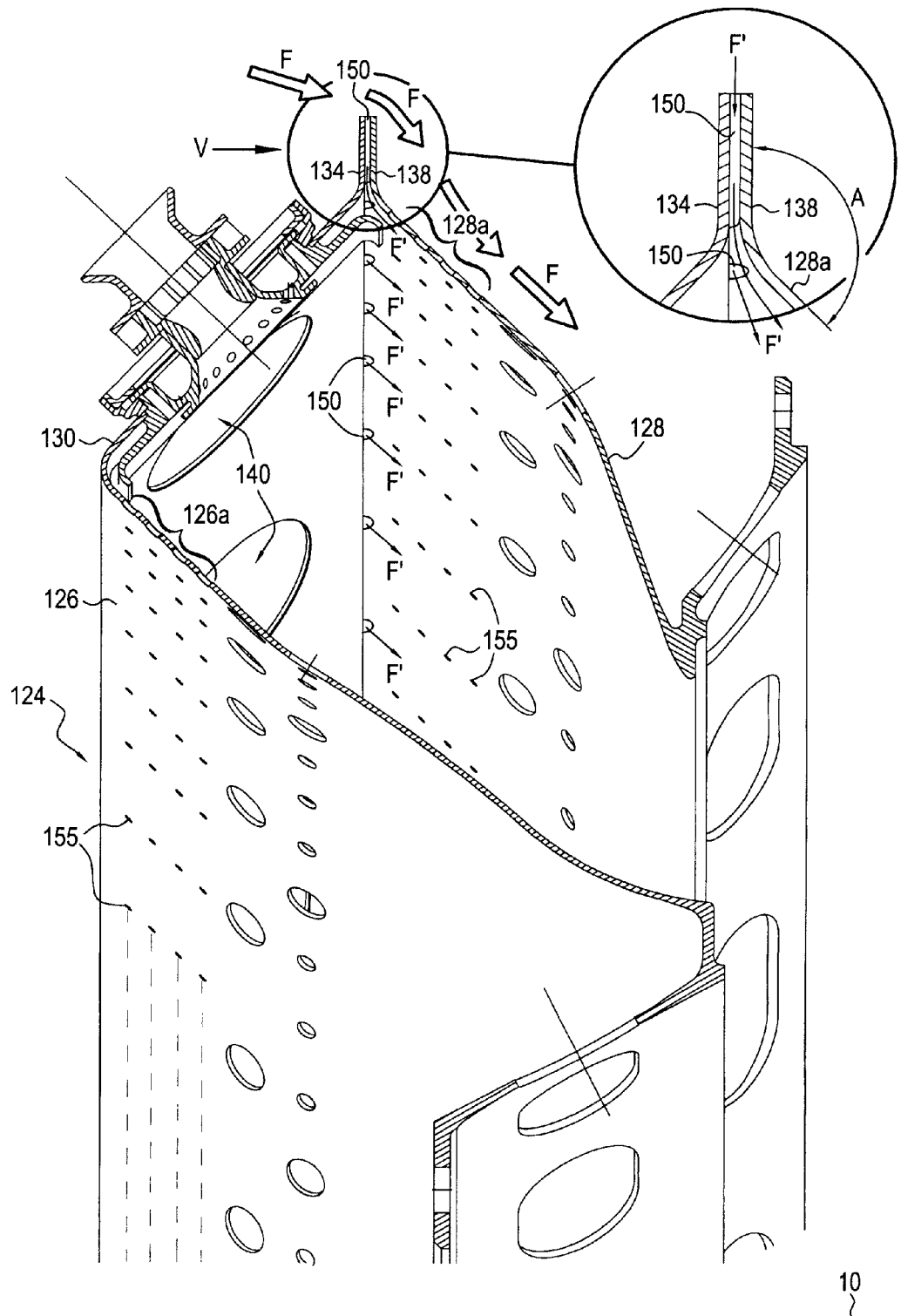
FIG. 4 is an axial half-section of a second example of a combustion chamber of the invention.

With reference to FIG. 4, there follows a description of a second example of a combustion chamber of the invention. Elements of this chamber 124 that are analogous to elements of the chamber 24 in FIG. 2 are given the same numerical references plus 100.

The chamber 124 is a so-called converging chamber, since its section decreases going from upstream to downstream. In addition, the chamber 24 is said to be steeply inclined since compared with the chambers of FIGS. 1 and 2 its director lines are steeply inclined relative to the axis 10 of rotation of the turbomachine. Inclining the combustion chamber 124 in this way serves to reduce the length it occupies along the axis 10 of the turbomachine.

In the combustion chamber 124, the inner wall 126 and the chamber end wall 130 are formed as a single piece, such that the chamber end wall 130 does not present an inner fastener rim, and the inner wall 126 does not present an upstream fastener rim.

In contrast, the chamber end wall 30 presents an outer fastener rim 134 and the outer wall 128 presents an upstream fastener rim 138. The chamber end wall 130 and the outer wall 128 are assembled together via their fastener rims by bolts. Such an assembly enables the outer wall 128 to be removed to give access to the inside of the combustion chamber 124 in the context of repair or maintenance operations.

In the combustion chamber 124, the fastener rims 134 and 138 are not oriented axially (i.e. along the axis 10) as in FIGS. 1 and 2, but practically radially (i.e. they are substantially perpendicular to the axis 10). Amongst other advantages, having the outer fastener rim 134 oriented in this way makes it easier to fabricate the chamber end wall. In particular, it can be made from metal sheet, specifically by stamping, which is much less expensive than making it from a part that has been machined in its bulk.

Nevertheless, the rims 134 and 138 oriented in this way form an obstacle for the air flow F. Thus, this flow F goes round the rims 134, 138 and simultaneously also round the outer wall portion 128a situated immediately behind these rims, such that this wall portion 128a is poorly cooled, in particular since its multiperforations 155 are not properly fed with air.

In this type of configuration where the rims 134, 138 mask the wall portion 128a, the cooling system of the invention is found to be particularly advantageous since, so to speak, it makes it possible to compensate for the poor supply of air to the multiperforations 155, thereby guaranteeing sufficient cooling of the outer wall portion 128a.

Figure 5:
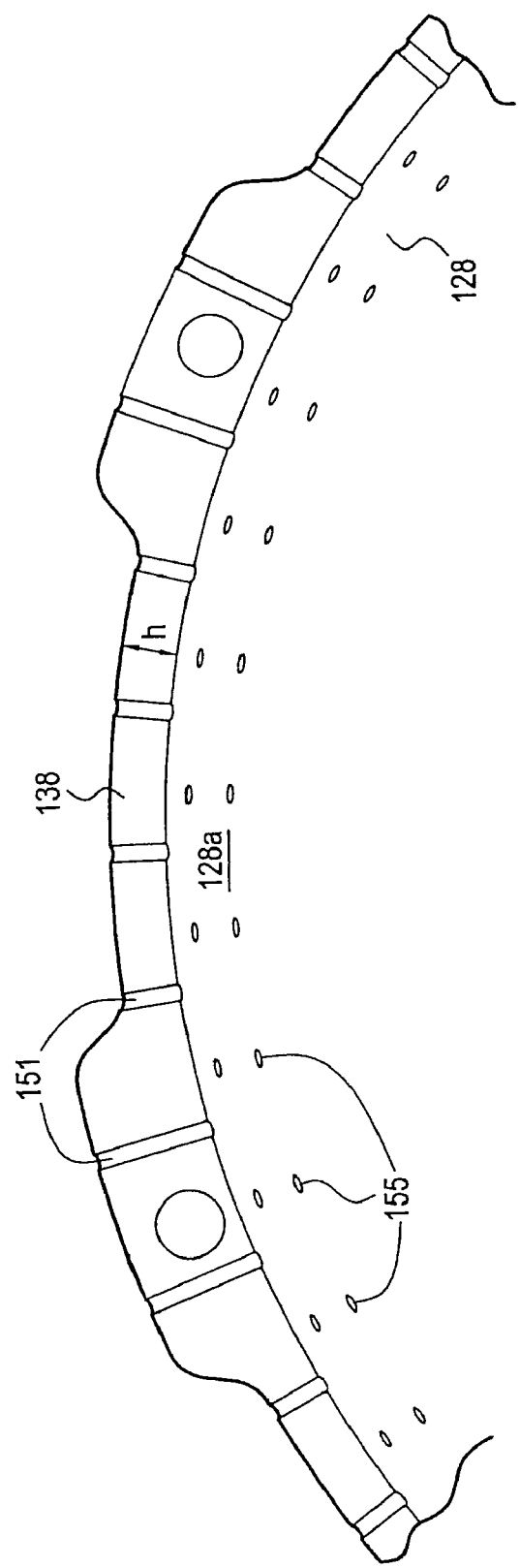
FIG. 5 is a fragmentary perspective view looking along arrow V, showing the upstream fastener rim of the outer wall.

In an embodiment of the invention, in order to mask the wall portion 128a as little as possible, the fastener rims 134 and 138 form scallops, as shown in FIG. 5. This limits the extent to which the air flow F is deflected where it passes over the portions of smaller height h.

The cooling channels 150 of FIG. 4 are made by forming grooves 151 in the upstream face of the fastener rim 138 of the outer wall 128, as shown in FIG. 5, and/or in the downstream face of the outer fastener rim 134 of the chamber end wall 130.

Figure 6:
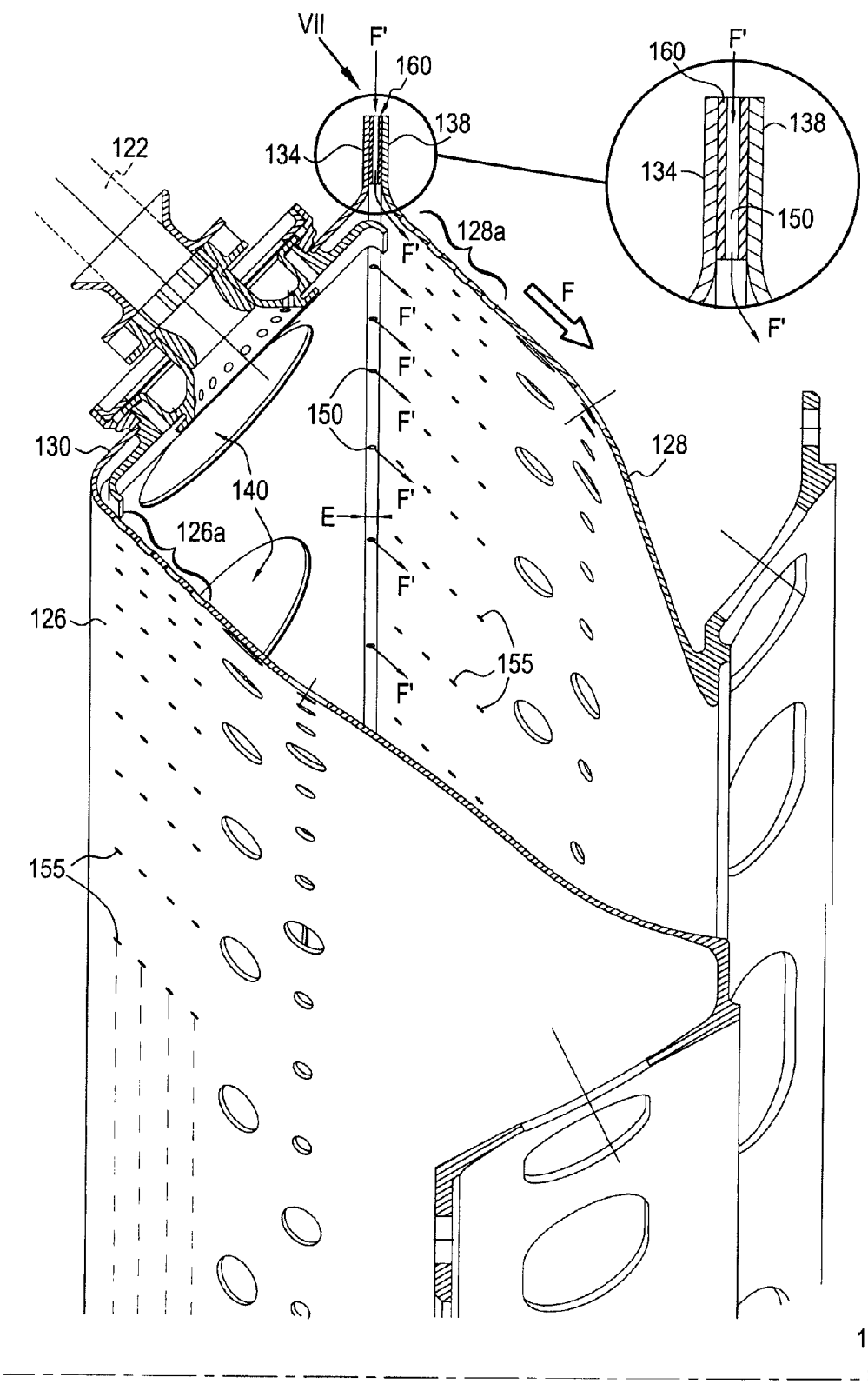
FIG. 6 is an axial half-section of a third example of a combustion chamber of the invention.
Figure 7A:
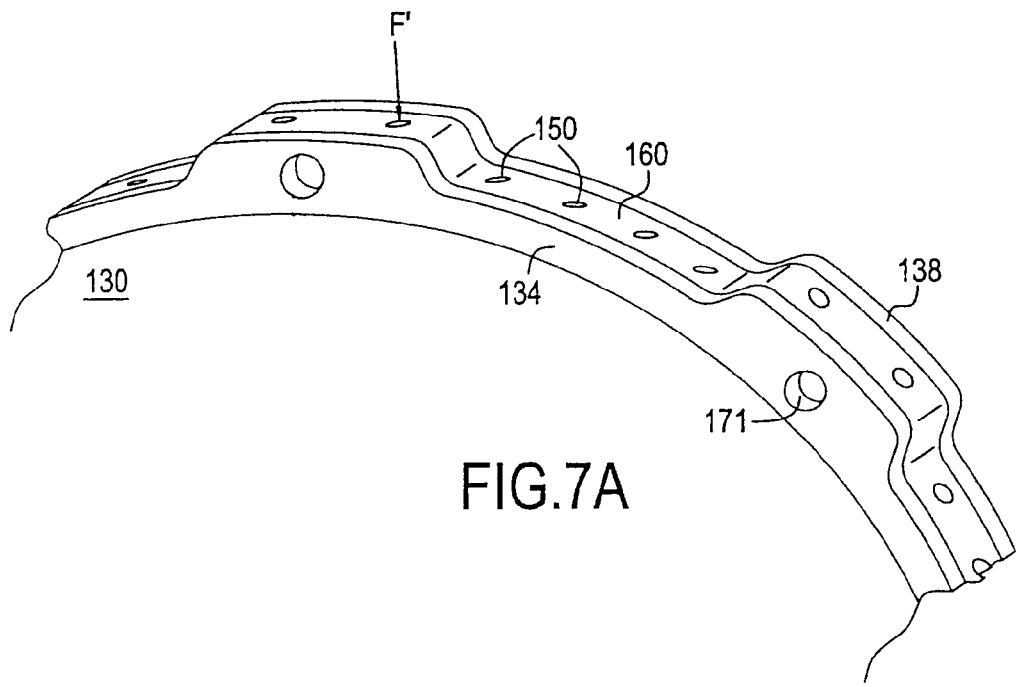
FIG. 7A is a detail view in perspective, looking along arrow VII in FIG. 6, showing specifically the spacer used in the invention.
Figure 7B:
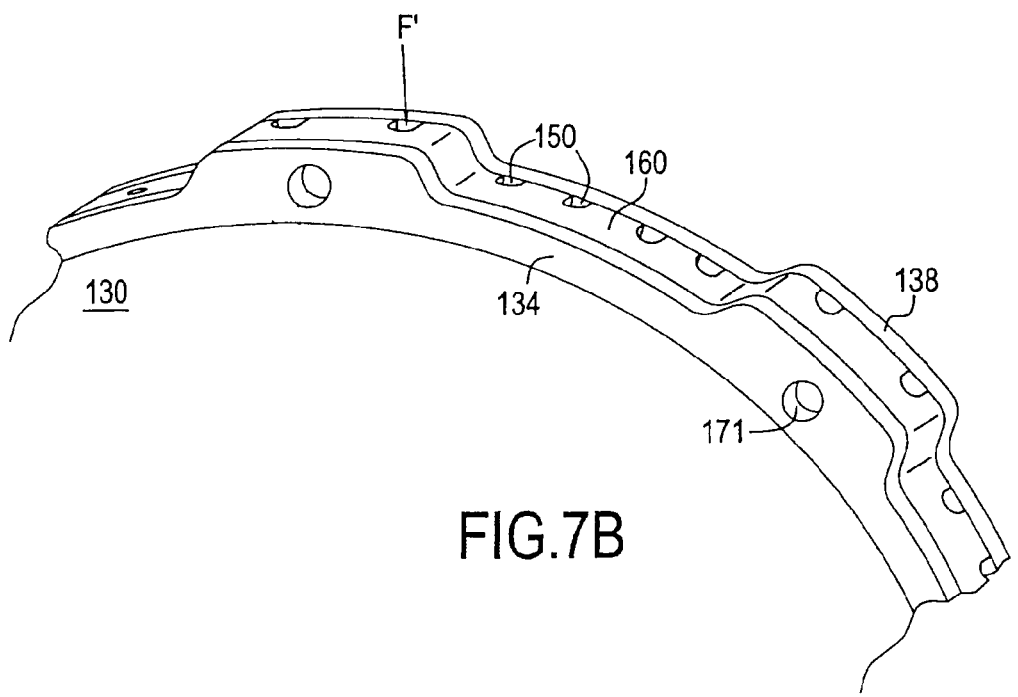
FIG. 7B is a view analogous to that of FIG. 7A showing another example of a spacer.

FIGS. 6, 7A, and 7B show a third example of a combustion chamber of the invention that differs from the chamber of FIG. 4 solely in that a spacer 160 is provided between the fastener rims 134 and 138.

The spacer 160 is in the form of a ring of thickness E (measured along the axis 10) and it forms scallops like the rims 134 and 138.

By acting on the thickness E of the spacer 160, the position of the chamber end wall 130 is adjusted. This enables the chamber end wall 130 to be positioned correctly relative to the fuel injector nozzles 122 drawn in dashed lines in FIG. 6.

In the example of FIGS. 6 and 7A, the cooling channels 150 are made (generally drilled) through the thickness of the spacer 160.

In another embodiment, the cooling channels 150 are formed by grooves formed on one of the sides (or both sides) of the spacer 160, as shown in FIG. 7B.

What is claimed is:

1. An annular combustion chamber for a turbomachine, the chamber comprising:
    an inner wall with an axially extending upstream fastener rim integrally made therewith and an outer wall with an axially extending upstream fastener rim integrally made therewith, downstream ends of the inner wall and the outer wall defining an outlet of the combustion chamber; and
    a chamber end wall disposed between said inner and outer walls in an upstream region of said chamber, the chamber end wall presenting a central portion provided with a plurality of orifices, an axially extending outer fastener rim, and an axially extending inner fastener rim, the outer and inner fastener rims being integrally made with the central portion of the chamber end wall, and the chamber end wall and the inner wall being fastened together via the inner fastener rim of the chamber end wall and the upstream fastener rim of the inner wall, the chamber end wall and the outer wall being fastened together via the outer fastener rim of the chamber end wall and the upstream fastener rim of the outer wall, with the inner fastener rim of the chamber end wall and the upstream fastener rim of the inner wall being in direct contact with each other and the outer fastener rim of the chamber end wall and the upstream fastener rim of the outer wall being in direct contact with each other,
    wherein cooling channels extend between the inner fastener rim of the chamber end wall and the upstream fastener rim of the inner wall, and between the outer fastener rim of the chamber end wall and the upstream fastener rim of the outer wall, from outside to inside of the combustion chamber, a first set of cooling channels being defined by an outer circumferential surface of the upstream fastener rim of the inner wall and an inner circumferential surface of the inner fastener rim of the chamber end wall, and a second set of cooling channels being defined by an inner circumferential surface of the upstream fastener rim of the outer wall and an outer circumferential surface of the outer fastener rim of the chamber end wall.

2. A combustion chamber according to claim 1, wherein the cooling channels are formed by grooves made in the fastener rim of the chamber end wall, and/or in the fastener rim of said inner or outer wall.

3. A combustion chamber according to claim 2, wherein said grooves are made by removing material of the fastener rim.

4. A combustion chamber according to claim 3, wherein said grooves be made by machining the fastener rim.

5. A combustion chamber according to claim 2, wherein said grooves are made by deforming the fastener rim.

6. A combustion chamber according to claim 5, wherein said grooves are made by stamping the fastener rim.

7. A combustion chamber according to claim 2, wherein the cooling channels are made by grooves formed both in the outer and inner fastener rims of the chamber end wall, and the fastener rim of the outer and inner walls.

8. A turbomachine including a combustion chamber according to claim 1.

9. A combustion chamber according to claim 1, wherein the outer and inner fastener rims of the chamber end wall are substantially parallel with the upstream fastener rims integrally made with the outer and inner walls.

10. An annular combustion chamber for a turbomachine, the chamber comprising:
    an inner wall;
    an outer wall with a radially extending upstream fastener rim; and
    a chamber end wall disposed between said inner and outer walls in an upstream region of said chamber, the chamber end wall integrally made with the inner wall and presenting a radially extending outer fastener rim integrally made with the end wall, the chamber end wall and the outer wall being fastened together via the outer fastener rim of the chamber end wall and the upstream fastener rim of the outer wall, with the fastener rims being in direct contact with each other,
    wherein cooling channels extend between the fastener rims, from outside to inside of the combustion chamber, the cooling channels being defined by a downstream surface of the outer fastener rim of the chamber end wall and an upstream surface of the upstream fastener rim of the outer wall, and
    wherein the turbomachine presents a main axis and the upstream fastener rim of the outer wall and the outer fastener rim of the chamber end wall extend substantially perpendicularly to said main axis.

11. A combustion chamber according to claim 10, wherein the fastener rims are scalloped.

12. A combustion chamber according to claim 1, wherein the chamber end wall and the outer and inner walls are fastened together by bolts passing through their fastener rims.

13. A combustion chamber according to claim 10, wherein a spacer is provided between the outer fastener rim of the chamber end wall and the upstream fastener rim of the outer wall.

14. A combustion chamber according to claim 13, wherein the spacer is in the form of a ring and is provided with scallops.

* * * * *